United States Patent
Doering et al.

[15] 3,676,503
[45] July 11, 1972

[54] PROCESS FOR PREPARING HYDROQUINONES

[72] Inventors: William Von E. Doering, Cambridge, Mass.; William J. Farrissey, Jr., Northford; Floro F. Frulla, Wallingford, both of Conn.

[73] Assignee: The Upjohn Company, Kalamazoo, Mich.

[22] Filed: April 16, 1970

[21] Appl. No.: 29,280

[52] U.S. Cl. ................................260/621 H, 260/621 R
[51] Int. Cl. .........................................................C07c 39/02
[58] Field of Search ..................................260/621 H, 621 R

[56] References Cited

UNITED STATES PATENTS 3,395,160  7/1968  McLean............................260/621 H

OTHER PUBLICATIONS

Matsumura et al., J.A.C.S. 53 pp. 1406–1408, 1931.

*Primary Examiner*—Howard T. Mars
*Attorney*—Denis A. Firth and John Kekich

[57] ABSTRACT

A one-step reductive hydrolytic method for preparing hydroquinone from p-nitrosophenol is disclosed.

Good yields of hydroquinone are obtained by heating p-nitrosophenol in a hydrogen atmosphere between 60° C – 150° C with a hydrogenation catalyst in an acid medium in the presence of an inert solvent.

6 Claims, No Drawings

PROCESS FOR PREPARING HYDROQUINONES

BACKGROUND OF THE INVENTION

1. Field of the Invention

This invention relates to a novel process for preparing hydroquinone from p-nitrosophenol. More particularly, this invention relates to a one step reductive hydrolysis of p-nitrosophenol to the corresponding hydroquinone.

2. Description of the Prior Art

The bulk of commercially available hydroquinone is produced by reduction of benzoquinone, which is first prepared by oxidation of aniline using, for example, manganese dioxide. U.S. Pat. No. 3,395,160 (McLean) discloses a two-step method for converting p-nitrosophenol to hydroquinone. In the first step the p-nitrosophenol is heated between 150° C – 200° C with a carbonyl compound in acid media to yield p-benzoquinone. The second step is reduction of the p-benzoquinone with a reducing agent or by catalytic hydrogenation.

It was also known heretofore to prepare hydroquinone directly from p-nitrosophenol by reduction of the latter with iron filings in acid. (Matsumura et al., J.A.C.S., Volume. 53, Pg. 1406). This method provides low yields and is not commercially desireable for a variety of reasons, but particularly because the desired product must be separated from a complex sludge of iron salts.

We have found that hydroquinone can be prepared directly from the corresponding p-nitrosophenol in a one step process of reductive hydrolysis employing a catalytic hydrogenation technique. By our method disclosed herein, good yields of hydroquinone are obtained. Further, the hydroquinone is easily and economically separated from the reaction mixture in pure form using standard techniques.

SUMMARY OF THE INVENTION

This invention comprises a process for preparing hydroquinone, which process comprises subjecting p-nitrosophenol to hydrogenation at a temperature within the range of about 60° C to about 150° C in an aqueous acidic medium in the presence of an inert organic solvent and a hydrogenation catalyst which is stable in acid media, the amount of p-nitrosophenol present in the initial reaction mixture being not more than about 5 grams per liter of said mixture.

Hydroquinone is a well known compound which is useful as a photographic developer, antioxidant, polymerization inhibitor, and as an intermediate in a number of organic chemical syntheses (Kirk-Othmer, Encyclopedia of Chemical Technology, 2nd edition, Vol. II pps. 488–9).

DETAILED DESCRIPTION OF THE INVENTION

The aqueous acid medium employed in the process of the invention comprises an aqueous solution of mineral acid. Illustrative of the mineral acids employed are sulfuric acid, phosphoric acid, hydrochloric acid and the like; preferably the mineral acid is sulfuric acid. The concentration of acid used can be from 0.1 N to 6 N and preferably is from 0.5 N to 3 N. The amount of acid so employed is important. Thus it is essential that the reaction mixture be maintained acid throughout the reaction period. This is accomplished by providing acid in an amount corresponding to at least one equivalent per mole of the p-nitrosophenol charged in the reaction mixture. Preferably, an excess of acid is employed, the preferred amount of acid being generally of the order of about 2 equivalents per mole of the p-nitrosophenol charged. The inert organic solvents employed in the process of the invention can be any of those organic solvents, substantially immiscible with water, which assist in solubilizing p-nitrosophenol, but do not themselves enter into the reaction ie. do not undergo any significant amount of hydrogenation under the conditions of the reaction or otherwise interfere in the desired course of the reaction. Examples of such inert organic solvents are ethyl acetate, butyl acetate, toluene, dibutyl ether, o-xylene, cyclohexanone, and the like. A particularly preferred solvent is butyl acetate.

The amount of inert organic solvent present in the reaction mixture is advantageously not greater in volume than the volume of aqueous acidic medium. Preferably the inert organic solvent is employed in an amount such that it constitutes about 10 percent to about 40 percent of the total volume of the reaction mixture. The amount of p-nitrosophenol employed as starting material in the process of the invention is critical insofar as the ultimate yield of hydroquinone is concerned. Thus we have found that the maximum amount of p-nitrosophenol present in the initial reaction mixture is of the order of 5 grams per liter, based on total volume of the reaction mixture. The use of amounts of p-nitrosophenol in excess of this maximum results in significant reduction in yield. Provided the above maximum is not exceeded, the precise concentration of p-nitrosophenol employed is not important.

The hydrogenation catalyst employed in the process of the invention can be any conventional catalyst usually used to catalyze the hydrogenation of an organic compound, subject to the requirement that it be stable in the acid medium. Examples of such catalysts include the noble metals, of which platinum and palladium are preferred. Supported catalysts such as platinum-on-carbon, palladium-on-carbon and palladium-on-barium sulfate are particularly preferred. Platinum-on-carbon is the most preferred hydrogenation catalyst.

The concentration of catalyst required is dependent upon the pressure of hydrogen present during hydrogenation. In general, higher hydrogen pressures enable the reaction to proceed favorably with lower catalyst concentrations. For example when hydrogen is employed at atmospheric pressure up to 15 psi above atmospheric pressure, the catalyst concentration is preferably within the range of about 5 percent to about 30 percent by weight of p-nitrosophenol. When hydrogen pressures of about 15 to 50 psi above atmospheric are employed, the preferred catalyst concentration is from about 2 percent to about 5 percent by weight of p-nitrosophenol.

The process of the invention is carried out at a temperature within the range of from about 60° C to 150° C, preferably from 80° C to 120° C. Throughout the reaction period the mixture is vigorously agitated using conventional apparatus and hydrogenation techniques.

Although the reaction proceeds satisfactorily over a wide range of hydrogen pressures, it is preferable to employ a hydrogen pressure of from about 15 to 50 psi above atmospheric so as to reduce the quantity of catalyst required, as previously stated.

Reaction is generally complete in about 1 to 3 hours, and completion of the reaction can be defected by standard analytical techniques such as those employing vapor phase chromatography, gel permeation chromatography, infrared and ultra violet analytical techniques.

The hydroquinone is easily separated from the reaction mixture using conventional techniques and apparatus. For example, a convenient separation can be performed by filtering the reaction mixture to remove solids, separating the organic layer and extracting the aqueous layer with such solvents as diethyl ether, ethyl acetate, and the like. The combined organic layer and solvent extract are washed, dried and evaporated. The hydroquinone which remains as residue can be further purified, if desired, by recrystallization from hot water, ether, ethyl acetate, ethyl alcohol and the like solvents.

The following examples describe the manner and process of making and using the invention and set forth the best mode contemplated by the inventors of carrying out the invention but are not to be construed as limiting.

EXAMPLE 1

To a Parr low pressure catalytic apparatus is charged 1.11 gms (9.04 millimoles) of p-nitrosophenol, 50.6 mg. of 1 percent platinum-on-carbon (Baker Chemical Co.) 200 cc of 1 N sulfuric acid, and 50 cc butyl acetate.

The reactor vessel is purged with hydrogen gas and charged additionally with hydrogen gas at 50 psig. The mixture is heated between 95° C to 99° C for about 1 hour during which time it is vigorously agitated. Thereafter it is cooled and the mixture filtered to remove catalyst and residue. The organic layer is separated and the aqueous layer of the filtrate is extracted 3 times with 200 ml. portions of ether The combined organic layer and extracts are washed with a solution of saturated sodium chloride, dried over anhydrous magnesium sulfate and heated to evaporate solvent. The residue is 0.68 gms of light tan crystalline needles identified by vapor phase chromatography as 71 percent hydroquinone (49 percent theoretical yield). Recrystallization from benzene yields pale yellow crystalline needles of purified hydroquinone.

EXAMPLE 2

To the apparatus of Example 1 is charged 1.15 gms (9.36 millimoles) of p-nitrosophenol, 37.5 mg of 1 percent platinum-on-carbon, 150 cc of 1.5 N sulfuric acid and 100 cc of butyl acetate. The reactor vessel is purged with hydrogen gas and charged additionally with hydrogen gas to 15 psig. The mixture is heated between 98° C to 103° C for about 1 hour during which time it is vigorously agitated. Thereafter it is cooled and the mixture filtered to remove catalyst and residue. The organic layer of the filtrate is separated and the aqueous layer is extracted 3 times with 200 ml. portions of ether. The combined organic layer and extracts are washed with a solution of saturated sodium chloride, dried over anhydrous magnesium sulfate, and heated to evaporate the solvent. The residue is 0.9 gms. of light tan crystalline needles identified by vapor phase chromatography as 57 percent hydroquinone (49.5 percent theoretical yield). Recrystallization from benzene yields purified hydroquinone.

EXAMPLE 3

To a suitable 1 liter vessel fitted with Vibro mixer, Model E-1, (a power agitating unit causing vertical vibration of a stirrer at a frequency corresponding to the A. C. power supply; Chemapec Inc. Hoboken, N. J.,) there is charged 1.02 gms (8.25 millimoles) of p-nitrosophenol, 213 mg. of 1 percent platinum-on-carbon, 200 ml. of 1 N sulfuric acid and 50 ml. of butyl acetate.

The mixture is heated between 88° C to 91° C for about 1 hour while hydrogen gas is passed over the vigorously agitated mixture. The mixture is then cooled and filtered to remove solids. The organic layer of the filtrate is separated and the aqueous layer is extracted four times with 150 cc portions of ether. The extracts are combined, washed with a saturated solution of sodium chloride, and dried over anhydrous sodium sulfate. Upon evaporation of ether, there is obtained 0.38 gms. of reddish brown solids identified by vapor phase chromatography as 84.5 percent hydroquinone. The organic layer previously separated is evaporated, yielding solids weighing 0.20 gms which are identified by vapor phase chromatography as 57.5 percent hydroquinone. The combined crude hydroquinone (0.58 gm) is recrystallized from benzene yielding 0.44 gms (48 percent theoretical yield) of purified hydroquinone.

EXAMPLE 4

This example is not an example of the invention, but illustrates a prior known method (Matsumura et al. supra) for preparing hydroquinone directly from p-nitrosophenol.

To a hot (circa 95° C) solution of 27 gms concentrated hydrochloric acid in 1,050 ml. of water is added 2.5 gms (20.2 millimoles) p-nitrosophenol. While maintaining the temperature at circa 95° C, 5 gms (89.5 millimoles) iron powder is slowly added over a period of about 1 hour with constant agitation of the reaction mixture. The reaction mixture is maintained at circa 95° C for an additional 1 hour with agitation and then filtered to remove residue. The cooled filtrate is extracted five times with 200 ml portions of ether. The extracts are combined, dried over sodium sulfate and heated to evaporate solvent, yielding 1 gm of reddish brown solids which are identified by vapor phase chromatography as containing 20 percent hydroquinone (9 percent theoretical yield).

What is claimed is:

1. A process for preparing hydroquinone which comprises: subjecting p-nitrosophenol to hydrogenation at a temperature within the range of about 60° C to about 150° C in an 0.1 N to 6 N aqueous solution of a mineral acid selected from the group consisting of sulfuric acid, phosphoric acid and hydrochloric acid and in the presence of an inert organic solvent selected from the group consisting of ethyl acetate, butyl acetate, toluene, dibutyl ether, o-xylene and cyclohexanone; said inert solvent being present in a volume less than the volume of aqueous acid solution employed; and in the presence of from about 2 percent to about 30 percent by weight of p-nitrosophenol of a noble metal hydrogenation catalyst which is stable in acid media; the amount of p-nitrosophenol present in the initial reaction mixture being not more than about 5 grams per liter of said mixture.

2. The process of claim 1 wherein said acid is sulfuric acid.

3. The process of claim 1 wherein said inert solvent is butyl acetate.

4. The process of claim 1 wherein said inert organic solvent constitutes from 10 percent to 40 percent by volume of the reaction mixture.

5. The process of claim 1 wherein said catalyst is platinum-on-carbon.

6. The process of claim 1 wherein said catalyst is present in a concentration of about 2 percent to about 5 percent by weight of p-nitrosophenol and the hydrogenation is carried out at a pressure of 15 psi to 50 psi above atmospheric pressure.

* * * * *